United States Patent [19]

Rodriquez

[11] 4,327,511

[45] May 4, 1982

[54] LUMINESCENT ALPHANUMERIC MODULAR DISPLAY

[76] Inventor: Paul R. Rodriquez, 14118 81st Pl. NE, Bothell, Wash. 98011

[21] Appl. No.: 132,876

[22] Filed: Mar. 24, 1980

[51] Int. Cl.³ .................. G09F 13/22; G09F 3/04; G09F 7/00
[52] U.S. Cl. ..................... 40/544; 40/452; 40/620
[58] Field of Search .............. 40/544, 542, 465, 553, 40/571, 573, 576, 620, 622, 447, 448, 449, 450, 451, 452; 362/34, 84, 209; 46/26, 25

[56] References Cited

U.S. PATENT DOCUMENTS

| 1,066,591 | 7/1913 | Ellis | 40/620 X |
| 1,844,097 | 2/1932 | Luhman | 40/573 |
| 2,791,723 | 5/1957 | Nagy et al. | 362/34 |
| 3,161,974 | 12/1964 | Blockson | 40/544 |
| 3,238,654 | 3/1966 | Rosenak et al. | 40/618 |
| 3,359,633 | 12/1967 | Motson | 40/544 X |
| 3,517,451 | 6/1970 | Rychlewski | 40/544 |
| 3,614,773 | 10/1971 | Gordon | 40/451 X |
| 4,009,535 | 3/1977 | Stock | 40/546 |
| 4,108,405 | 8/1978 | Gibson | 40/902 X |
| 4,195,431 | 4/1980 | Neufeld | 40/544 |

Primary Examiner—Gene Mancene
Assistant Examiner—Michael J. Foycik
Attorney, Agent, or Firm—Seed, Berry, Vernon & Baynham

[57] ABSTRACT

A sheet of electroluminescent material in the shape of an alphanumeric character is embedded in a rigid base. An exciter unit for transforming incoming electric power to the appropriate voltage and frequency for driving the luminescent material is also embedded in the base behind the character. Each character, base and exciter unit thus form a self-contained display module. A universal interconnecting member is used to electrically and mechanically interconnect the module to any other module with the proper horizontal or vertical spacing. The gap between adjacent display modules may be filled with either a cover or an electrically active header which contains such devices as an electric eye for applying power to the modules after dark or a rechargable battery charged by either an external power supply or an internal solar cell.

16 Claims, 10 Drawing Figures

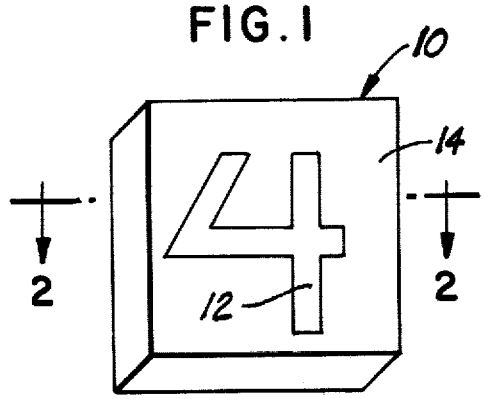
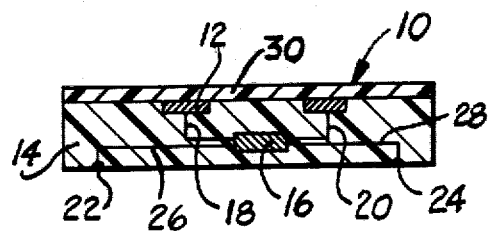
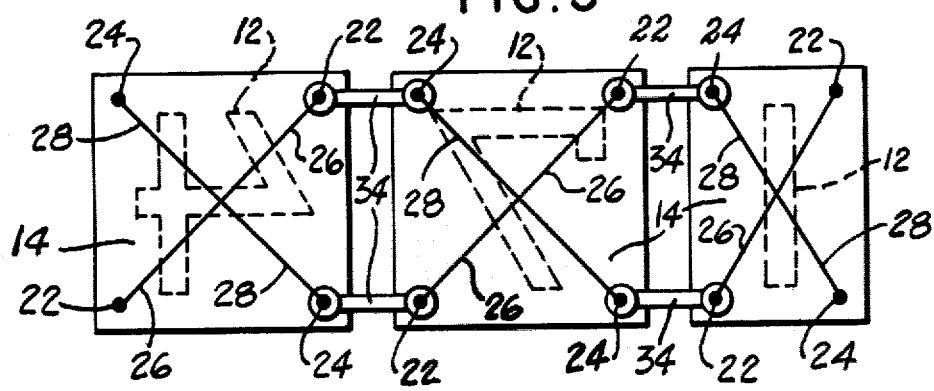
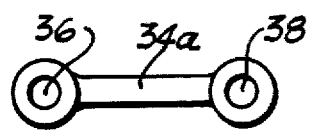
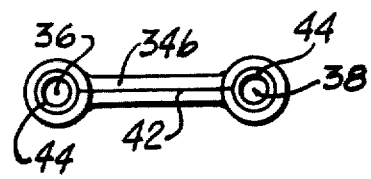
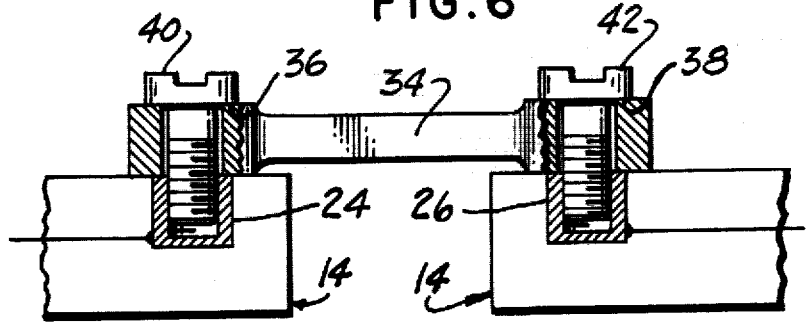

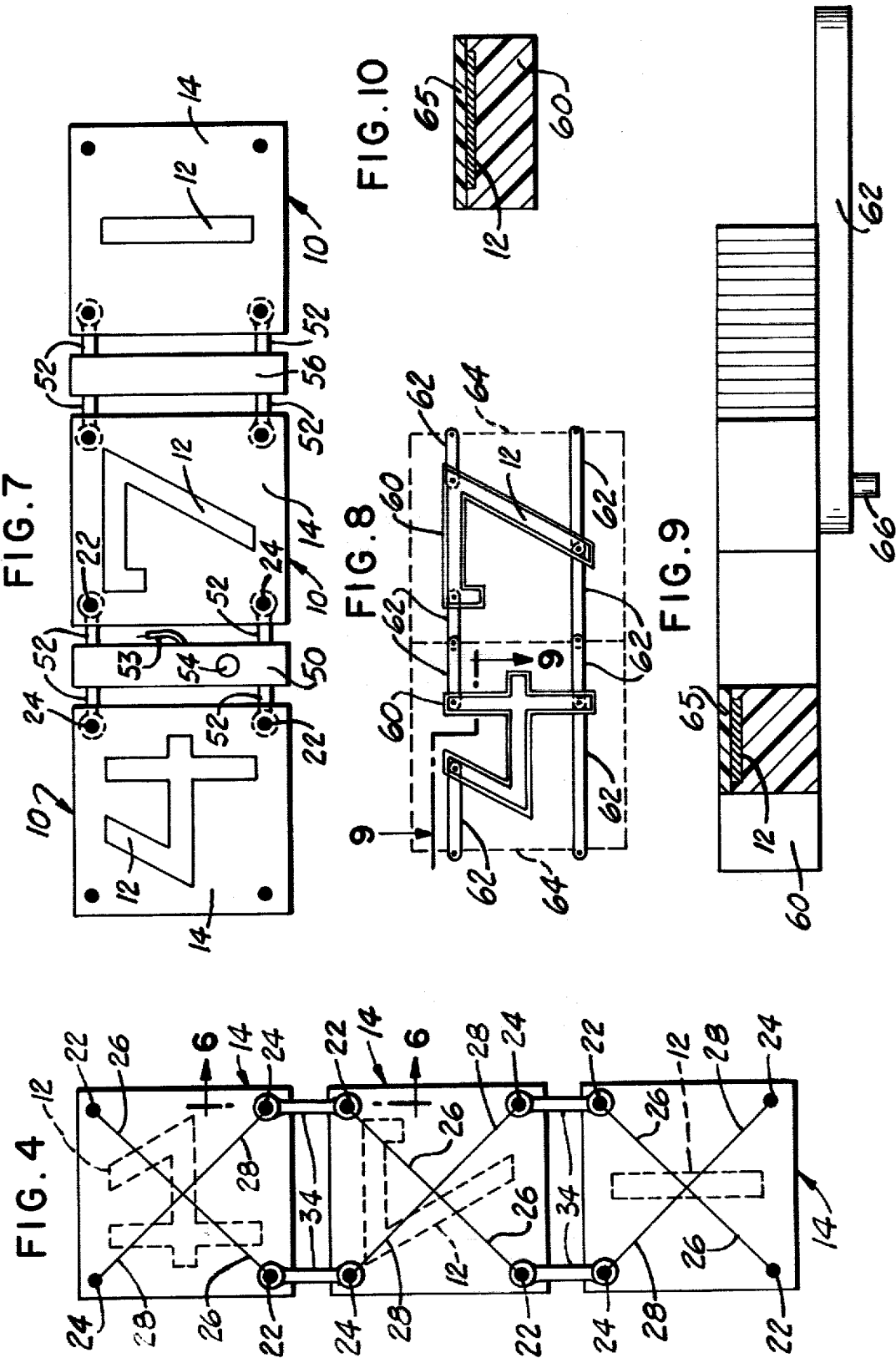

LUMINESCENT ALPHANUMERIC MODULAR DISPLAY

BACKGROUND OF THE INVENTION

1. Field of the Invention

This invention relates to illuminated alphanumeric displays, and more particularly to a low power, long life illuminated alphanumeric display module which can be easily combined with other display modules.

2. Description of the Prior Art

Combinations of numbers are universally displayed on domestic and commercial buildings to identify the street address of the building. These numbers are usually fabricated of a solid material which contrasts with the color of the building to make the numbers readily visible. However, such numbers are generally not visible at night, thus making nighttime identification of a building having a known address difficult.

Attempts have been made to make building identification numbers as visible at night as they are in the day. These attempts have generally involved mounting an incandescent light behind a light transmissive plate having the identification numerals marked thereon. These incandescent light displays are readily visible at night and thus solve the aforementioned problems associated with conventional non-illuminated numerals. However, they have not met with popular acceptance due, primarily, to their choice of a light source. The incandescent lights which are used require a fairly high power and thus have a significant operating expense. Further, their high power consumption precludes the use of batteries, solar cells or the like to power the bulb. Additionally, incandescent lights must be replaced fairly often.

Recently, sheets of a luminescent material have been used to provide illumination for alphanumeric displays. These electroluminescent sheets are basically a capacitor having two conducting surfaces with a dielectric therebetween. A luminescent pigment is dispersed within the dielectric so that a high frequency, fairly high voltage signal applied between the two conducting surfaces causes current to flow through the dielectric, thereby causing the pigment to glow. The primary advantage of these electroluminescent sheets as a display is their low power consumption and long, useful life. These devices have been used as alphanumeric displays, but always by placing a continuous luminescent sheet behind an opaque mass having transparent alphanumeric characters through which the luminescent sheet is exposed.

Either of the above-described illuminated alphanumeric displays are somewhat inflexible in that the display must be manufactured to display a specific combination of alphanumeric characters. It is relatively difficult to vary the combination of characters, and manufacture of the display is thus a custom project.

SUMMARY OF THE INVENTION

It is an object of the invention to provide illuminated alphanumeric characters which can be easily and quickly interconnected and arranged in a variety of combinations.

It is another object of the invention to provide an illuminated alphanumeric display which consumes relatively little power.

It is still another object of the invention to provide an illuminated alphanumeric display which utilizes a light source which lasts indefinitely and thus requires a minimum of maintenance.

It is a further object of the invention to provide a modular illuminated alphanumeric display which may be easily and inobtrusively interfaced with a variety of control and power devices.

These and other objects of the invention are provided by a modular display formed by an electroluminescent sheet having the shape of an alphanumeric character. The sheet is mounted on a rigid base within which an exciter unit is embedded. The exciter unit includes a pair of input leads receiving power from an external source and a pair of outward leads connected to the electroluminescent sheet. The exciter unit converts incoming power from an external source to an alternating current signal having the proper frequency and voltage for driving the luminescent sheet. The luminescent sheet, base and exciter unit thus form a self-contained display module. The base of the modular display may be rectangular in plan view, and the width of the base varies depending on the width of the character so that the characters are equally spaced when the bases of the modules are equally spaced apart from each other. Each input lead of the exciter unit is preferably connected to electrical connectors positioned at opposite corners of the base so that both leads of the exciter unit are accessible at all edges of the base, thereby allowing the modules to be arranged either vertically or horizontally. The electrical connectors at the corners of the bases may be threaded, electrically conductive inserts recessed in the corners of the base with the bases at opposite corners being connected to each other and to one of the output leads to the exciter unit. The inserts of one module can then be connected to the corresponding inserts of an adjacent module with a rigid, electrically conductive bar having a pair of eyes through which a screw is inserted and threaded into a respective insert. The display module may also include an elongated, electrically active manifold mounted adjacent an edge of a base and connected to the module through a pair of transversely projecting, electrically conductive ears. The manifold may include a light actuated switch for connecting power to the exciter units of the modules when ambient light falls below a predetermined value. It may contain a rechargable battery which may be either externally charged or charged by an internal solar battery charger, or it may contain a connector receiving power from external wiring.

In an alternative embodiment, the base may conform to the shape of the electroluminescent sheet. In this configuration a pair of electrically conductive, rigid support rods projecting from each side of the base may be used to electrically and mechanically connect a display module to other modules. Equal spacing between adjacent characters may be provided by utilizing support rods which project from the field of the character the same distance for all characters.

BRIEF DESCRIPTION OF THE DRAWINGS

FIG. 1 is an isometric view of one embodiment of an alphanumeric modular display;

FIG. 2 is a cross-sectional view taken along the line 2—2 of FIG. 1;

FIG. 3 is a back plan view of several display modules interconnected with each other in a horizontal arrangement;

FIG. 4 is a back plan view of several display modules interconnected with each other in a vertical arrangement;

FIGS. 5a and 5b are plan views of two structures for electrically and mechanically interconnecting display modules;

FIG. 6 is a cross-sectional view taken along the line 6—6 of FIG. 4;

FIG. 7 is a front plan view showing several display modules connected to each other having an electrically active manifold and a cover positioned between adjacent modules;

FIG. 8 is a front plan view of an alternative embodiment of the display module; and FIG. 9 is a cross-sectional view taken along the line 9—9 of FIG. 8.

FIG. 10 is an enlarged view of a portion of FIG. 9.

DETAILED DESCRIPTION OF THE INVENTION

One embodiment of an electroluminescent alphanumeric modular display 10, as illustrated in FIG. 1, includes a sheet of electroluminescent material 12 having the shape of an alphanumeric character such as the number "4". The sheet 12 is mounted on a rigid base 14 of suitable material, such as plastic, epoxy or the like. It is important to note that the base 14 does not form a mask for the sheet 12 in order to form the alphanumeric character. Instead, it is the shape of the sheet 12 itself which forms the character.

As best illustrated in FIG. 2, the sheet 12 is preferably recessed in the front surface of the base 14 so that it is flush with the base 14. An exciter unit of conventional design 16 is embedded in the base 14. The exciter unit 16 includes a pair of output leads 18, 20 which deliver an alternating current signal to the electroluminescent sheet 12 of a suitable frequency and voltage. Power is applied to the exciter unit 16 from a pair of electrical connectors 22, 24 through respective leads 26, 28. When electrical power is applied to the connectors 22, 24, the electroluminescent sheet 12 glows thereby making the alphanumeric character readily visible in the dark. The nature of the power received by the exciter unit 16 can vary as desired, since electrical converter systems are well known. For example, the incoming power may be either direct current or alternating current, and the voltage of the incoming power may also vary.

If desired, the face of the electroluminescent sheet 12 and the face of the base 14 may be covered with a transparent sheet 30 to protect the luminescent sheet 12 and the base 14 from dirt and moisture.

It is thus seen that the electroluminescent sheet 12, base 14 and exciter unit 16 form a self-contained display module 10. Consequently, display modules 10 of different alphanumeric character can be combined as desired. Accordingly, it is important for the mounting structure for the modules 10 to allow the modules 10 to be interconnected with each other in a variety of arrangements. The principal difficulty in this regard stems from the requirement that both input leads 26, 28 for the exciter 16 be accessible at all four edges of the module so that the modules 10 can be both horizontally and vertically arranged in any order. For example, if lead 26 extended along the top edge of the module 10 while the lead 28 extended along the lower edge of the module 10, it would be possible to arrange the modules 10 horizontally. But vertical arrangements of the modules 10 would not be possible since only the one lead 28 would be accessible at the lower edge of the module 10.

As best illustrated in FIGS. 3 and 4, each of the leads 26, 28 extends to opposite corners of the bases 14 where they are fastened to respective electrical connectors 22, 24, respectively. Thus, both leads 26, 28 are available at each edge of the base 14 regardless of whether the modules 10 are arranged horizontally as illustrated in FIG. 3 or vertically as illustrated in FIG. 4.

Although the connectors 22, 24 of adjacent modules 10 may be interconnected with a variety of structures, the technique illustrated in FIGS. 5 and 6 may be advantageously used. Accordingly, the connectors 22, 24 may be electrically conductive, threaded inserts which are recessed in the base 14 of each module 10. The bases 14 may then be interconnected with a rigid, electrically conductive bar 34 having a pair of eyes 36, 38 formed at each end thereof. Screws 40, 42 are inserted through the respective eyes 36, 38 and threaded into the respective inserts 22, 24, thereby electrically and mechanically connecting the modules 10 to each other as illustrated in FIGS. 3 and 4.

As illustrated in FIGS. 5a and 5b, two embodiments of the bar 34 may be employed. In the first embodiment, illustrated in FIG. 5a the bar 34a is fabricated entirely of an electrically conductive material such as aluminum, steel or copper. The embodiment 34b of FIG. 5b utilizes an electrically insulative rod, which is preferably transparent, having a relatively small and hence relatively hidden conductor 42 extending between conductive cylinders 44 lining the eyes 36, 38 of the bar 34b. The advantage of the embodiment of FIG. 5b is that the electrical and mechanical interconnecting members 34 are less visible, thus making the display modules 10 appear to be unconnected to each other.

If desired, the display modules 10 may be interconnected with an electrically active manifold 50 as illustrated in FIG. 7. The manifold 50 includes a pair of electrically conductive ears 52 projecting from each side of the manifold 50 which are secured to electrical connectors 22, 24 in the same manner as the interconnecting rods 34. The electrically active manifold 50 may perform a variety of functions. It may receive electrical power from an external source and use a switch actuated by a light sensor 54, such as a photocell or solar cell, to control a switch to connect the external source to the connectors 22, 24 when ambient light falls below a predetermined value. The manifold 50 may also contain a rechargable battery which may be charged either by an external battery charger or by an internal solar powered charger. The manifold 50 may alternatively include a two-wire conductor 53 which receives power, preferably of a low voltage, from an external source. In order to preserve the symmetry of the arrangement of display modules 10, an elongated cover 56, also having a pair of electrically conductive ears 52 projecting therefrom, may be positioned between other display modules.

An alternative embodiment of the display module 10 illustrated in FIGS. 8, 9 and 10 includes a rigid base 60 having a shape which conforms to the shape of the electroluminescent sheet 12 so that the shape of the base 14 is less visible. The bases 60 of each module 10 are physically and electrically connected to the base of other modules 10 by rods 62 projecting from opposite sides of each base 60. In order to allow the characters to be arranged either vertically or horizontally, the rods 62 may pivot with respect to the bases 60, and the rods 62 may be of a non-conducting material and contain two conductors. Each alphanumeric character formed by the sheets 12 has associated with it a character field 64 determined by the width and height of the character. In order to equally space the characters formed by the sheets 12 apart from each other, the rods 62 should all project the same distance from the sides of the character field as illustrated in FIG. 8. Thus, when the rods 62 of adjacent characters are connected to each other, the characters will be equally spaced apart from each other. As with the embodiment of FIG. 1, the electroluminescent sheet and base 60 may be covered with a clear sheet 65 to protect the electroluminescent sheet 12 and base 60 from dirt and moisture. Also, as with the embodiment of FIG. 1, the rod 62 may have an eye formed at its end through which a screw 66 passes and is threaded into an insert embedded in the base 60.

The inventive display module 10 thus utilizes relatively little power, may be arranged either vertically or horizontally in any manner and requires little or no maintenance. Further, it may easily and inobtrusively interface with a variety of control and power devices depending upon the specific application used.

I claim:

1. A luminescent alphanumeric modular display, comprising:
   an electroluminescent sheet having the shape of an alphanumeric character, said sheet having a pair of power leads to which an alternating current power signal is applied to illuminate said sheet;
   a base of rigid material on which the rear face of said character is mounted; and
   an exciter unit imbedded in said base having its output connected to the power leads of said electroluminescent sheet said exciter unit transforming electrical power from an external source to alternating current power of the appropriate frequency and voltage to drive said electroluminescent sheet.

2. The modular display of claim 1, wherein said base is rectangular in plan view.

3. The modules display of claim 2, wherein the width of said base varies depending on the width of said character so that said characters are equally spaced apart from each other when the bases of said modules are equally spaced apart from each other.

4. The display module of claim 1, wherein power is delivered to said exciter unit through a pair of power leads each conneted to respective pairs of electrical connectors at opposite corners of said base such that adjacent electrical connectors of a plurality of said display modules may be interconnected when said modules are arranged either horizontally or vertically, thereby connecting both power leads of each module to corresponding power leads of an adjacent module.

5. The display module of claim 4, wherein adjacent connectors of each pair of modules are interconnected by a rigid, electrically conductive bar.

6. The display module of claim 4, wherein adjacent connectors of each pair of modules are interconnected by a transparent, rigid, electrically insulative bar having a conductor extending therethrough.

7. The display module of claim 4, wherein said connectors are threaded, electrically conductive bosses recessed in the corners of said base with the bosses at opposite corners of said bases being connected to each other and to one of the power leads of said exciter unit and wherein adjacent bosses of adjacent display modules are interconnected by a rigid, electrically conductive bar having an eye at each end through which a screw passes and is threaded into a respective boss, thereby mechanically and electrically connecting a plurality of display modules to each other.

8. The display module of claim 7, wherein said rigid, electrically conductive bar is in the form of a transparent, rigid, electrically insulative bar having a conductor extending therethrough which is connected to respective electrically conductive liners surrounding respecting eyes formed at the ends of said bar.

9. The display module of claim 4, further including an elongated, electrically active manifold mounted adjacent an edge of one of said bases, said manifold having a pair of transversely projecting, electrically conductive ears connected to respective electrical connectors at the adjacent corners of said bases.

10. The display mdoule of claim 9, further including an elongated cover mounted between the side edges of adjacent bases, thereby preserving the symmetry of said modules when said modules are arranged in a group.

11. The display module of claim 9, wherein said electrically active manifold receives power from an external source through a pair of power leads and includes solar cell switching means for connecting said power leads to respective electrically conductive ears when ambient light falls below a predetermined value.

12. The display module of claim 9, wherein said electrically active manifold includes a rechargable battery having a pair of terminals connected to respective electrically conductive ears, thereby eliminating the need to route power lines to said display module.

13. The display module of claim 12, wherein said electrically active manifold further includes solar charging means for converting incident sunlight to electrical energy for recharging said battery during daylight hours.

14. The display module of claim 1, wherein said base conforms to the shape of electroluminescent sheet.

15. The display module of claim 14, further including a pair of electrically conductive, rigid supports projecting from each side of said base being connected to a support projecting from the opposite side of said base and to respective power leads of said exciter unit such that said supports electrically and mechanically interconnect a plurality of said display modules.

16. The display module of claim 15, wherein all of said support rods project the same distance from the field of said character such that said characters are equally spaced from each other in a plurality of said display modules are interconnected to said supports.

* * * * *